United States Patent [19]

Annamalai

[11] Patent Number: 4,964,142
[45] Date of Patent: Oct. 16, 1990

[54] RECEIVER SYNCHRONIZATION IN ENCODER/DECODER

[76] Inventor: Kadiresan Annamalai, 343 Donahe Dr., Milpitas, Calif. 95035

[21] Appl. No.: 72,955

[22] Filed: Jul. 15, 1987

[51] Int. Cl.⁵ .............................................. H04L 7/04
[52] U.S. Cl. .................................. 375/118; 370/105.3
[58] Field of Search .............. 375/114, 116, 118, 117; 370/108, 94, 100, 102, 48, 105.3; 369/60

[56] References Cited

U.S. PATENT DOCUMENTS

| | | | |
|---|---|---|---|
| 4,573,172 | 2/1988 | Grimaldi | 375/116 |
| 4,740,962 | 4/1988 | Kish, III | 375/116 |
| 4,748,623 | 5/1988 | Fujimoto | 375/116 |
| 4,792,966 | 12/1988 | Ballweg | 370/102 |

Primary Examiner—Douglas W. Olms
Assistant Examiner—Marianne Huseman
Attorney, Agent, or Firm—Fliesler, Dubb, Meyer & Lovejoy

[57] ABSTRACT

Method and apparatus suited for use with a decoder receiving data serially from a network is disclosed providing synchronization throughout reception and decoding of packets of symbols. An appropriately-delayed read pointer initialization strobe used by an elastic buffer portion of the receiver provides the sequence of synchronization signals which avoids deletion of bits of packet preamble.

6 Claims, 2 Drawing Sheets

RECEIVER SYNCHRONIZATION IN ENCODER/DECODER

CROSS-REFERENCE TO RELATED, CO-PENDING APPLICATIONS

Related, co-pending applications of particular interest to the instant application are U.S. Pat. No. 4,703,486 entitled "Communication Data Encoder/Decoder Component System Architecture" filed Dec. 18, 1984, on behalf of G. Bemis and U.S. Pat. No. 4,692,894, entitled "Overflow/Underflow Detection for Elastic Buffer", filed Dec. 18, 1984 on behalf of G. Bemis.

FIELD OF THE INVENTION

This invention relates to the serial transmission of digital data, and more particularly, to synchronization of bytes of serial data received over a local area network.

BACKGROUND OF THE INVENTION

In local area networks, when a node joins the network, the first stream of signals it receives are connection management symbols. The symbols are especially chosen so that they can be decoded by an encoder/decoder (ENDEC) of the node without regard to their alignment within a byte of the signal stream. In a standard 4-bit/5-bit encoding scheme, the start of the connection management symbols can be at any one of the 10 bits within the "byte". Decoding of these connection management symbols precedes without regard to this alignment because of their chosen nature. However, once these symbols are processed, decoding of the data packet following these symbols requires that their "bytes" be aligned.

Typically, the required alignment was provided by the detection of a packet delimiter called a "JK" symbol/pair. Under this procedure, a preamble "byte" immediately preceding the "JK" symbol-pair could be misinterpreted, being an incorrectly decoded byte.

Also because of the manner in which an elastic buffer, used in a typical ENDEC, is reset upon detection of the "JK" delimiter and then initialized, a few bits in the byte-stream are dropped, resulting in a non-integral number of bytes in the preamble.

Furthermore, a typical ENDEC generated a SMASH signal whenever a JK symbol-pair is detected which differs in synchronization from that currently in effect.

SUMMARY OF THE INVENTION

In accordance with the present invention, synchronization for a data packet of "bytes" received by an ENDEC occurs one byte prior to detection of the "JK" symbol pair. The synchronizing signal is taken as the signal used to initialize a read pointer in an elastic buffer of the ENDEC, delayed by two bit periods. By ensuring that JK detection occurs exactly one byte after the read pointer initialization, byte synchronization is maintained throughout reception and decoding of the packet. In particular, a pattern of bits being all ONES representing an "IDLE" symbol will then precede the "JK" symbol pair as opposed to an incorrectly-decoded byte. In a preferred embodiment, the read pointer initialization occurs two bits before the third bit of the "JK" symbol pair (which is a ZERO) is read out of the elastic buffer.

By using an appropriately-delayed read pointer initialization strobe signal as the byte synchronization signal, the instant invention avoids generation of a SMASH signal because the previous byte in synchronous with the new "JK" symbol-pair. In accordance with the instant invention, deletion of up to nine bits of IDLE symbols is avoided by the incorrect decoding of the byte prior to the new "JK" symbol; the byte prior to the "JK" symbol-pair is correctly decoded and thus the symbol stream is left unmodified.

DETAILED DESCRIPTION OF A PREFERRED EMBODIMENT

Figure 1:
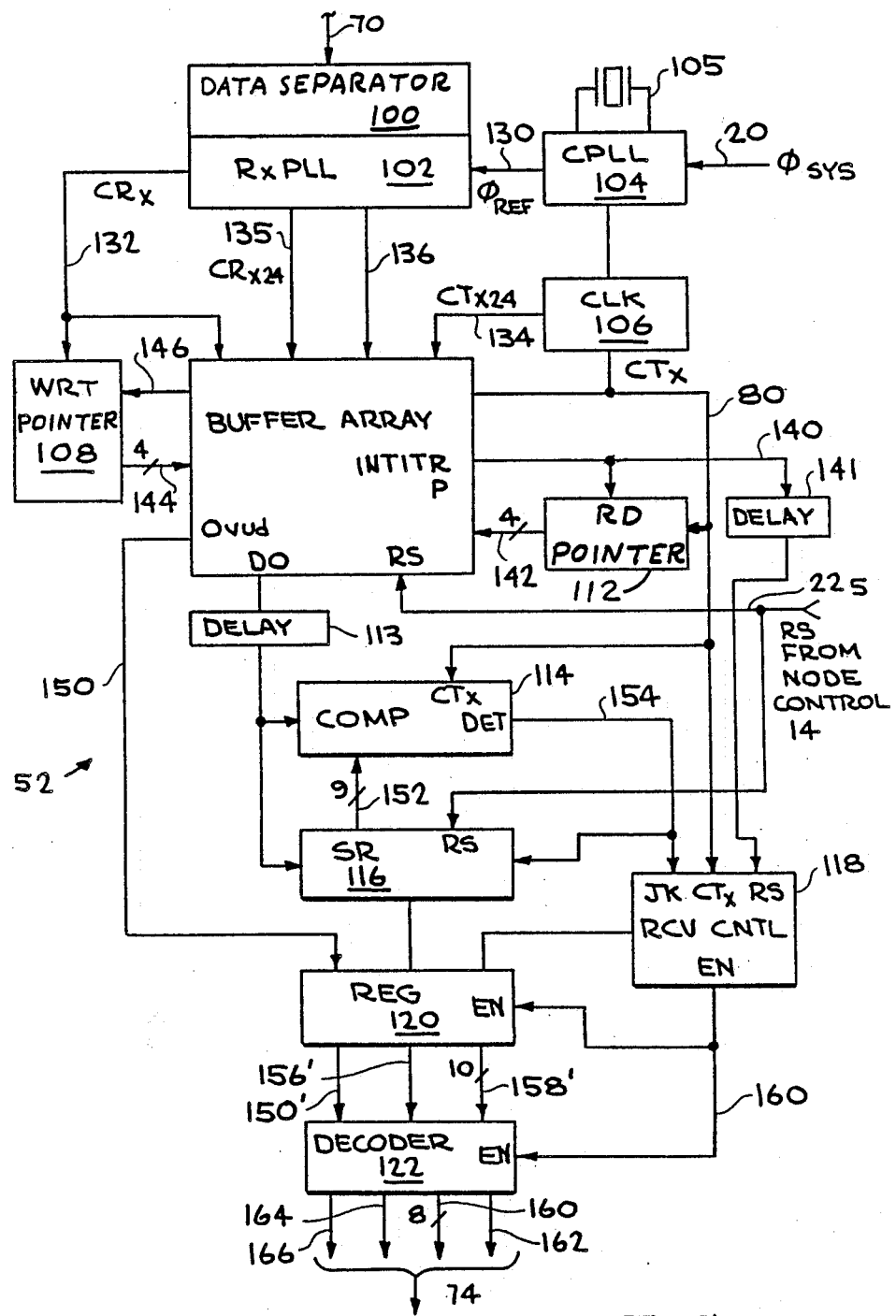
FIG. 1 is a block diagram of an encoder/decoder (ENDEC) employing received-byte synchronization of the instant invention.

FIG. 1 is a block diagram of an encoder/decoder (ENDEC) 12 which is described in all respects, other than will be described hereinafter, in the related, co-pending applications entitled "Communication Data Encoder/Decoder System Architecture" and "Overflow/Underflow Detection for Elastic Buffer"; said description incorporated by reference herein.

As shown in FIG. 1, the RCV CNTL 118 has a reset (RS) terminal receiving, via a delay block 141, the initialized read pointer (INITRP) strobe signal generated by BUFFER ARRAY 110. Furthermore, the enable (EN) signal generated by RCV CNTL 118 on signal line 160 is conducted both to an enable (EN) terminal of register (REG) 120 and to an enable (EN) terminal of DECODER 122. The output signals generated at the DO terminal of BUFFER ARRAY 110 are conducted to a two-bit period DELAY block 113 before being conducted on signal line 72 to comparator 114 and shift register 116. FIG. 1 of the instant application is in all other respects identical to FIG. 3 of the related, co-pending applications.

Briefly, received data traverses the elastic buffer, comprising write pointer (WP) 108, buffer array 110, and read pointer (RP) 112. Data is written into array 110 using a memory array location determined by the write pointer and read from the array using a location determined by the read pointer. The elastic buffer is initialized using an INITEB strobe signal which becomes active during reset of the ENDEC 12, during elastic buffer overflow/underflow conditions or during reception of a start-of-packet delimiter ("JK" symbol-pair), which is preceded by at least three symbols of preamble called the IDLE symbol, encoded as five ONEs.

Various connection management symbols, such as a VIOLATON, a QUIET, a HALT, a MASTER and the IDLE symbol are employed in standard protocols which cause initiation of connection of the ENDEC to a network, as is more fully described in the related application. In particular, the pointers 108 and 112 of the elastic buffer are initialized upon reset of the ENDEC 12, and the connection management symbols received are read out of the buffer array 110 and decoded by DECODER 122. The serial data (SDATA) is first passed through DELAY 113, serial-to-parallel shift register 116 and then stored in the register (REG) 120. REG 120 receives a byte synchronization strobe signal at its enable (EN) terminal which causes the parallel data signals applied by SR 116 to be stored in the REG 120.

The DECODER 122 similarly receives the byte synchronization strobe signal at an Enable (EN) terminal which suppresses generation of a SMASH symbol thereby whenever the parallel data signals applied by REG 120 to the DECODER 122 represent a QUIET, HALT, IDLE or VIOLATION symbol.

Delay 141 receives the INITRP signal generated by buffer array 110. RCV CNTL 118 receives at its reset terminal an INITRP1 signal generated by delay 141, and generates therefrom the enable signals received by REG 120 and DECODER 122. RECV CNTL 118 assures that the reading of serial data from the buffer array 110 is synchronous with respect to the operation of DECODER 122.

Due to the protocol standards adopted, the connection management symbols Q, H and I can be decoded with byte alignment provided from any bit of the five-bit encoded bit group received by the buffer array 110. Thus, the byte alignment occurring at the time the RCV CNTL 118 is reset can be used to decode correctly the connection management symbols, except for any one-byte period during a change in the connection management symbol received. However, the protocol standards permit a one byte violation during connection.

Figure 2:
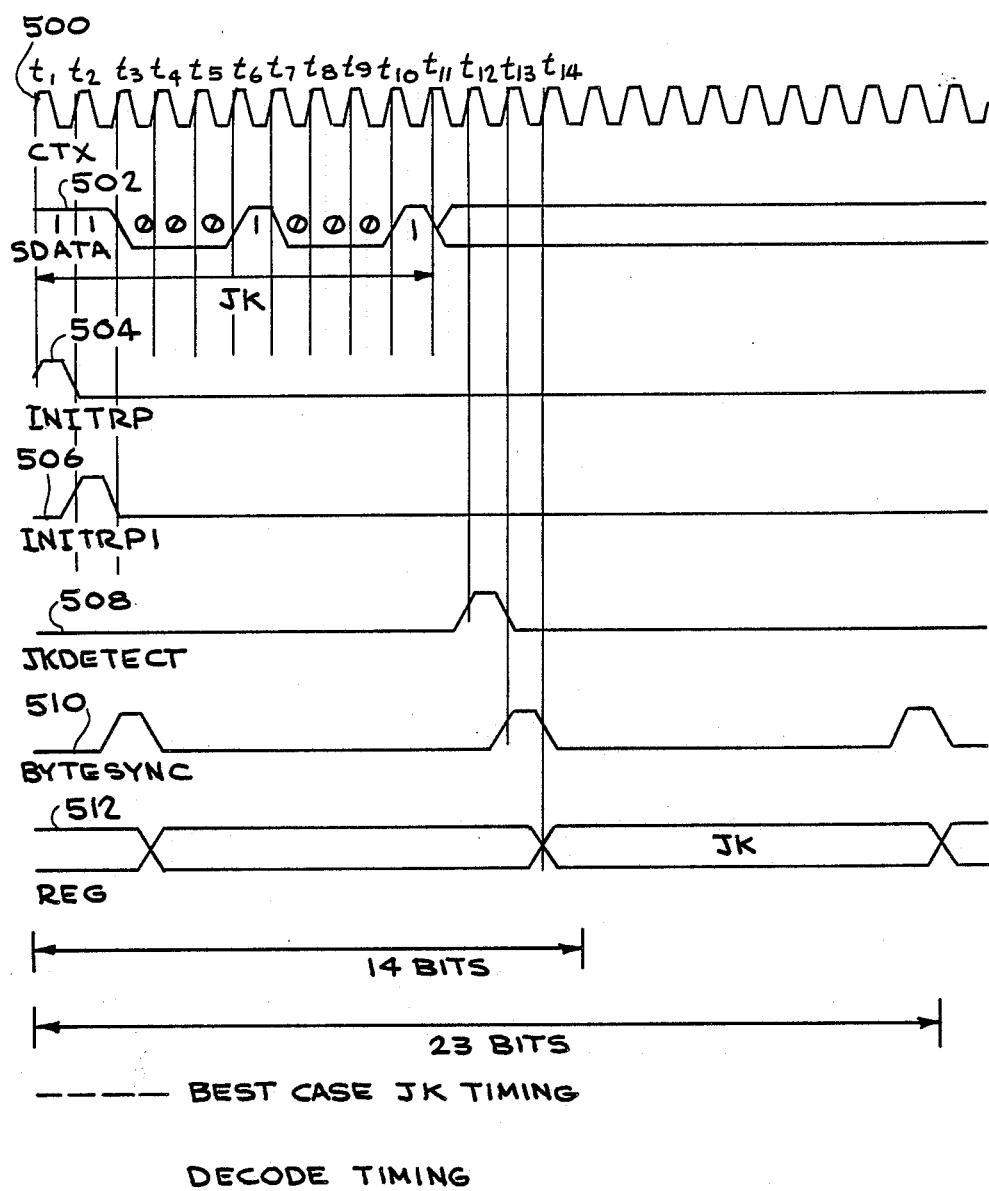
FIG. 2 is a diagram illustrating the timing of the instant invention.

FIG. 2 is a timing diagram which will be referred to in the following description of the operation of the synchronization provided by the invention. The transmitted data clock signal (CTX) 500 is shown in FIG. 2; CTX is received by all the major blocks of the receiver buffer 50 and decoder 52 shown in FIG. 1. The serial data (SDATA) 502, data out (DO) conducted via DELAY 113 on line 72 to the comparator 114 and serial-to-parallel shift register 116, is shown in FIG. 2. The particular signals corresponding to the JK symbol-pair is shown in the first ten CTX clock periods, t1, t2, ..., t10.

The initialize read pointer (INITRP) strobe signal 504 generated by buffer array 110 is shown occurring coincident with t1, i.e., with transmission of the first bit of the JK symbol-pair. The INITRP signal is received by the delay 141 and the INITRP1 strobe signal 506 then generated at the next CTX clock, i.e., at t2.

Reception of the INITRP1 signal by RCV CNTL 118 causes it to generate a Byte Sync signal 510, on signal line 160 conducted to EN terminal of REG 120.

The comparator 114 generates a JK DETECT signal 508 on signal line 154 received at the JK terminal of RCV CNTL 118 during the CTX clock cycle (t12) upon reception of the tenth bit of the JK symbol-pair at the comparator 114 via signal line 72. RCV CNTL 118, in response, generates the Byte Sync signal 510 during the next CTX clock cycle (t13) on signal line 160 to the enable terminal of REG 120.

Reception of the Byte Sync Signal causes the "JK" symbol-pair now stored in parallel in SR 116, to be loaded into REG 120 during the next CTX clock cycle (t14). Accordingly, signals representing the JK symbol-pair, 512 are aligned ten clock cycles later than the clock cycle t3 INITRP1 strobe 506 returning to inactive. Hence, no SMASH signal will be generated.

In accordance, then, with the instant invention, a synchronization signal will be generated one byte before (t2) detection of the start-of-data-packet JK symbol and maintained throughout remainder of the data packet. Since synchronization is achieved sufficiently early, no possibly corrupted bits are contained in the decoder register 122 at any time during decoding and accordingly, misinterpretation of these signals by the decoder 122 is avoided by the instant invention. Also, no IDLE symbol bits will be deleted by the synchronization provided by the instant invention, based on a misinterpretation of the byte before the start-of-data-packet JK symbol. Accordingly, generation of a SMASH signal is avoided for a new packet occurring after at least three IDLE symbols.

While the invention has been disclosed in terms of an illustrative preferred embodiment, it is understood that variations on the embodimetnt may be made and still be within the scope of the invention. For example, the INITRP1 signal could be taken directly from the BUFFER ARRAY 110 and conducted directly to RCV CNTL 118 one bit period prior to the INITRP signal. The two delay blocks DELAY 113 and DELAY 141 could then be eliminated. The resulting function is the same as provided by that described in the preferred embodiment and reduces the timing latency by two bit periods.

Accordingly, it is understood that the scope of the invention is measured solely by the appended claims.

I claim:

1. A method of synchronizing the decoding of packets of symbols stored in a n-bit register, said symbols serially received from a network and serially stored in an elastic buffer, said elastic buffer being responsive to a buffer reset signal and including a read pointer means, coupled to said elastic buffer, for determining a buffer read location of signals to be serially read from said elastic buffer, said elastic buffer, responsive to said buffer reset signal, providing a read pointer initialization signal to said read pointer means to initialize said read pointer means in response to said buffer reset signal, said elastic buffer and said read pointer means being responsive to a source of clock signals having a predetermined period, said method comprising the steps of:

(a) generating a signal from said read pointer initialization signal;

(b) delaying said generating signal for a predetermined time period;

(c) generating a synchronization signal during a clock period;

(d) detecting a predetermined start-of-packet delimiter upon serial reception of signals from said elastic buffer, delayed by a first predetermined number of said clock periods m, said packet delimiter comprising signals received over a second predetermined number of said clock periods n;

(e) generating said synchronization signal during the next clock period following said detection at step (d) and at every second predetermined number of clock periods thereafter;

(f) loading into said n-bit register, in parallel, synchronized by said signal generated at step (e), signals, representing said symbols, serially read from said elastic buffer, delayed by said m clock periods, during the second predetermined number of clock periods preceding generation of said signal generated by step (e).

2. A decoding synchronization method according to claim 1 wherein said symbols serially received from said network are serially loaded into an n-stage serial-to-parallel shift register responsive to said clock signals, and wherein step (e) further includes loading in parallel the contents of said serial-to-parallel shift register into said n-bit register, synchronized by said signal generated at step (e).

3. A decoding synchronization method according to claim 1 wherein said signal generated at step (b) is delayed one of said clock periods and wherein m=2.

4. A decoding synchronization apparatus according to claim 1 wherein said symbols serially received from said network are serially loaded into an n-stage serial-to-parallel shift register responsive to said clock signals, and synchronization signal generatng means further includes loading in parallel the contents of said serial-to-parllel shift register into said n-bit register, synchronized by said signal generated by said synchronization signal generating means.

5. A decoding synchronization apparatus according to claim 1 wherein said signal generated by said delaying means is delayed one of said clock periods and wherein m=2.

6. An apparatus for synchronizing the decoding of packets of symbols stored in a n-bit register, said symbols serially received from a network and serially stored in an elastic buffer, said elastic buffer being responsive to a buffer reset signal and including a read pointer means, coupled to said elastic buffer, for determining a buffer read location of signals to be serially read from said elastic buffer, said elastic buffer, responsive to said buffer reset signal providing a read pointer initialization signal to said read pointer means to initialize said read pointer means in response to said buffer reset signal, said elastic buffer and said read pointer means responsive to a source of clock signals having a predetermined period, said apparatus comprising:

means for generating a signal from said read pointer initialization signal;

means for delaying said generating signal for a predetermined time period;

means for generating a synchronization signal during a clock period;

means for detecting a predetermined start-of-packet delimiter upon serial reception of signals from said elastic buffer, delayed by a first predetermined number of said clock periods m, said packet delimiter comprising signals received over a second predetermined number of said clock periods n, said synchronization signal generating means generating a signal during the next clock period following said detection by said detecting means and at every second predetermined number of clock periods thereafter; and means for loading into said n-bit register, in parallel, synchronized by said signal generated by said signals representing said symbols serially read from said elastic buffer, delayed by said m clock periods, during the second predetermined number of clock periods preceding operation of said signal generated by said synchronization signal generating means.

* * * * *